US009961752B2

(12) United States Patent
Ihara

(10) Patent No.: US 9,961,752 B2
(45) Date of Patent: May 1, 2018

(54) CONTROL DEVICE AND METHOD FOR ASSIGNING ID NUMBER

(71) Applicant: Panasonic Intellectual Property Management Co., Ltd., Osaka (JP)

(72) Inventor: Kosuke Ihara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/620,377

(22) Filed: Jun. 12, 2017

(65) Prior Publication Data

US 2017/0367166 A1    Dec. 21, 2017

(30) Foreign Application Priority Data

Jun. 15, 2016  (JP) .................. 2016-119428

(51) Int. Cl.
*H05B 37/02* (2006.01)
*H04L 29/12* (2006.01)
*H04L 29/08* (2006.01)
*H04L 12/24* (2006.01)

(52) U.S. Cl.
CPC ..... *H05B 37/0272* (2013.01); *H04L 41/0893* (2013.01); *H04L 41/22* (2013.01); *H04L 61/2061* (2013.01); *H04L 67/12* (2013.01)

(58) Field of Classification Search
CPC ............... H05B 37/02; H05B 37/0272; H05B 37/0245; H04L 41/0893; H04L 41/22; H04L 61/2061; H04L 67/12
See application file for complete search history.

(56) References Cited

U.S. PATENT DOCUMENTS

| 9,294,188 B2 * | 3/2016 | Oshima ................ H04B 10/116 |
| 2014/0168967 A1 * | 6/2014 | Itami ....................... F21V 21/15 |
| | | 362/233 |
| 2014/0225510 A1 | 8/2014 | Kuchiki et al. |
| 2014/0270794 A1 * | 9/2014 | Rothenberg ......... H04B 10/116 |
| | | 398/118 |
| 2014/0292224 A1 * | 10/2014 | Yamamoto ......... H05B 37/0263 |
| | | 315/294 |
| 2017/0079257 A1 * | 3/2017 | Haensgen ............ A01K 97/125 |

FOREIGN PATENT DOCUMENTS

| JP | 2002-289364 A | 10/2002 |
| JP | 2013-054867 A | 3/2013 |
| JP | 2013-125634 A | 6/2013 |
| JP | 2014-120351 A | 6/2014 |
| JP | 2014-192005 A | 10/2014 |

* cited by examiner

*Primary Examiner* — Thai Pham
(74) *Attorney, Agent, or Firm* — McDermott Will & Emery LLP

(57) ABSTRACT

A control device which is connected to luminaires includes: a storage which stores associations between types of luminaires and identification (ID) number ranges for each of the types; an identifying unit which identifies a type of each of the luminaires; and an assigning unit which, by reference to the associations, assigns, to each of the luminaires, an ID number in an ID number range for the type identified by the identifying unit such that, among the luminaires, luminaires of a same type have consecutive ID numbers in the ID number range.

20 Claims, 9 Drawing Sheets

| TYPE | GROUP | ID NUMBER RANGE |
|---|---|---|
| a | 1 | 1-10 |
| b | 2 | 1-20 |
| c | 1 | 11-30 |
| d | 1 | 31-40 |
| e | 2 | 21-30 |
| ⋮ | ⋮ | ⋮ |

FIG. 4A

| LUMINAIRE | TYPE |
|---|---|
| 20a | a |
| 20b | a |
| 20c | a |
| 20d | a |
| 20e | b |
| 20f | b |
| 20g | a |
| 20h | b |
| ... | ... |

FIG. 4B

| LUMINAIRE | ID NUMBER |
|---|---|
| 20a | 1 |
| 20b | 2 |
| 20c | 3 |
| 20d | 4 |
| 20e | 1 |
| 20f | 2 |
| 20g | 5 |
| 20h | 3 |
| ... | ... |

FIG. 5A

| LUMINAIRE | GROUP |
|---|---|
| 20a | 1 |
| 20b | 1 |
| 20c | 1 |
| 20d | 1 |
| 20e | 2 |
| 20f | 2 |
| 20g | 1 |
| 20h | 2 |
| ... | ... |

FIG. 5B

| CONNECTOR | GROUP |
|---|---|
| 31a | 1 |
| 31b | 1 |
| 31c | 1 |
| 31d | 1 |
| 31e | 2 |
| 31f | 2 |
| 31g | 1 |
| 31h | 2 |
| ... | ... |

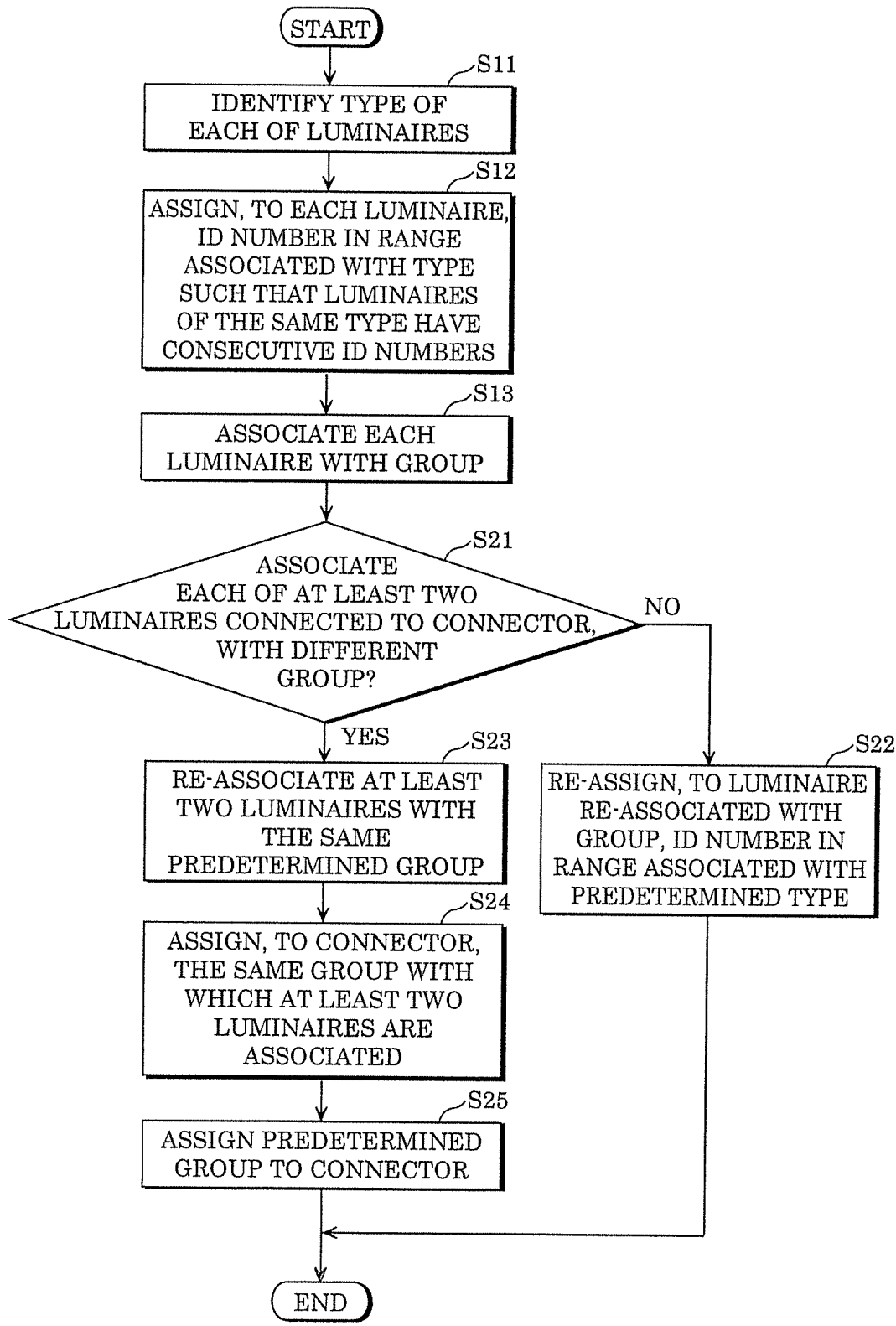

FIG. 8A

| LUMINAIRE | TYPE |
|---|---|
| 20a | a |
| 20i | a |
| 20b | a |
| 20c | a |
| 20d | a |
| 20e | b |
| 20f | b |
| 20g | a |
| 20h | b |
| 20j | a |
| ⋮ | ⋮ |

FIG. 8B

| LUMINAIRE | ID NUMBER |
|---|---|
| 20a | 1 |
| 20i | 2 |
| 20b | 3 |
| 20c | 4 |
| 20d | 5 |
| 20e | 1 |
| 20f | 2 |
| 20g | 6 |
| 20h | 3 |
| 20j | 7 |
| ⋮ | ⋮ |

FIG. 9A

| LUMINAIRE | GROUP |
|---|---|
| 20a | 1 |
| 20i | 1 |
| 20b | 1 |
| 20c | 1 |
| 20d | 1 |
| 20e | 2 |
| 20f | 2 |
| 20g | 1 |
| 20h | 2 |
| 20j | 1 |
| ⋮ | ⋮ |

FIG. 9B

| LUMINAIRE | GROUP |
|---|---|
| 20a | 1 |
| 20i | 1 |
| 20b | 1 |
| 20c | 1 |
| 20d | 1 |
| 20e | 2 |
| 20f | 2 |
| 20g | 1 |
| 20h | 1 |
| 20j | 1 |
| ⋮ | ⋮ |

FIG. 10

| LUMINAIRE | ID NUMBER |
|---|---|
| 20a | 1 |
| 20i | 2 |
| 20b | 3 |
| 20c | 4 |
| 20d | 5 |
| 20e | 1 |
| 20f | 2 |
| 20g | 6 |
| 20h | 8 |
| 20j | 7 |
| ⋮ | ⋮ |

FIG. 11

| CONNECTOR | GROUP |
|---|---|
| 31a | 1 |
| 31b | 1 |
| 31c | 1 |
| 31d | 1 |
| 31e | 2 |
| 31f | 2 |
| 31g | 1 |
| 31h | 1 |
| ⋮ | ⋮ |

CONTROL DEVICE AND METHOD FOR ASSIGNING ID NUMBER

CROSS REFERENCE TO RELATED APPLICATION

This application claims the benefit of priority of Japanese Patent Application Number 2016-119428 filed on Jun. 15, 2016, the entire content of which is hereby incorporated by reference.

BACKGROUND

1. Technical Field

The present disclosure relates to a control device to which luminaires are connected and which assigns identification (ID) numbers to the luminaires, and a method for assigning an ID number.

2. Description of the Related Art

A lighting system is known which controls luminaires in a theater, a stage, or a studio, etc. The luminaires are respectively assigned ID numbers and connected to a control device such as a lighting control console. In addition, the control device stores control data for causing the luminaires to perform a desired operation (e.g., luminaires outputting light at a predetermined lighting control rate or light of a predetermined color), in association with the ID numbers. The control device transmits to the luminaires a signal including combinations of the control data and the ID numbers (e.g., 512 combinations according to DMX512-A (Digital Multiplex)), and makes it possible to cause each of the luminaires which is assigned the ID number to perform a desired operation corresponding to the ID number, by the luminaire executing the control data included in the signal and corresponding to the ID number assigned to the luminaire. Patent Literature (PTL) 1 (Japanese Unexamined Patent Application Publication No. 2014-120351) discloses a technique relating to such a lighting system.

SUMMARY

Luminaires used are replaced with different ones or installation positions of luminaires are changed depending on a program or contents of an event in a theater or a stage, etc. or contents of filming in a studio. Every time this replacement or change is made, the luminaires are manually assigned ID numbers associated with control data for causing the luminaires to perform a desired operation. However, luminaires installed in a theater, a stage, or a studio, etc. often total more than several hundred, and it takes some time and is burdensome to manually assign the ID numbers to the luminaires.

In view of this, it is an object of the present invention to provide a control device and a method for assigning an ID number which make it possible to easily assign luminaires ID numbers for controlling the luminaires.

A control device according to one aspect of the present disclosure is a control device which is connected to luminaires and includes: a storage which stores associations between types of luminaires and identification (ID) number ranges for each of the types; an identifying unit which identifies a type of each of the luminaires; and an assigning unit which, by reference to the associations, assigns, to each of the luminaires, an ID number in an ID number range for the type identified by the identifying unit such that, among the luminaires, luminaires of a same type have consecutive ID numbers in the ID number range.

A method for assigning an ID number according to one aspect of the present disclosure is a method for assigning an ID (identification) number to each of luminaires connected to a control device, and the method includes: identifying a type of each of the luminaires; and assigning, by reference to associations, to each of the luminaires, an ID number in an ID number range for the type identified in the identifying such that, among the luminaires, luminaires of a same type have consecutive ID numbers in the ID number range, the associations being stored in a storage included in the control device and being associations between types of luminaires and ID number ranges for each of the types.

The control device and method for assigning an ID number according to the aspects of the present disclosure make it possible to easily assign luminaires ID numbers for controlling the luminaires.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 4A is a diagram illustrating examples of respective types of luminaires identified by an identifying unit according to Embodiment 1;

FIG. 4B is a diagram illustrating examples of ID numbers respectively assigned to the luminaires by an assigning unit according to Embodiment 1;

FIG. 5A is a diagram illustrating an example of associations between luminaires and groups made by an associating unit according to Embodiment 1;

FIG. 5B is a diagram illustrating examples of groups respectively assigned to connectors by the assigning unit according to Embodiment 1;

FIG. 7 is a flow chart illustrating an example of an operation performed by a control device according to Embodiment 2;

FIG. 8A is a diagram illustrating examples of respective types of luminaires identified by an identifying unit according to Embodiment 2;

FIG. 8B is a diagram illustrating examples of ID numbers respectively assigned to the luminaires by an assigning unit according to Embodiment 2;

FIG. 9A is a diagram illustrating an example of associations between luminaires and groups made by an associating unit according to Embodiment 2;

FIG. 9B is a diagram illustrating an example of associations between luminaires and groups remade by the assigning unit according to Embodiment 2;

FIG. 10 is a diagram illustrating examples of ID numbers respectively re-assigned to the luminaires by the assigning unit according to Embodiment 2; and FIG. 11 is a diagram illustrating examples of groups respectively assigned to connectors by the assigning unit according to Embodiment 2.

DETAILED DESCRIPTION OF THE EMBODIMENTS

Hereinafter, embodiments of the present disclosure will be described in detail with reference to the drawings. It is to be noted that the embodiments described below each show a specific example of the present disclosure. Therefore, the numerical values, structural elements, the arrangement and connection of the structural elements, steps (processes), and the order of the steps, etc. shown in the following embodiments are mere examples, and are not intended to limit the present disclosure. As such, among the structural elements in the following embodiments, those not recited in any one of the independent claims which indicate the broadest inventive concepts will be described as optional structural elements.

It is also to be noted that the figures are schematic diagrams and are not necessarily precise illustrations. Additionally, the same structural elements are given the same reference signs in the figures.

Embodiment 1

Hereinafter, Embodiment 1 will be described with reference to FIG. 1 to FIG. 5B.

[Configuration of Lighting System]

Figure 1:
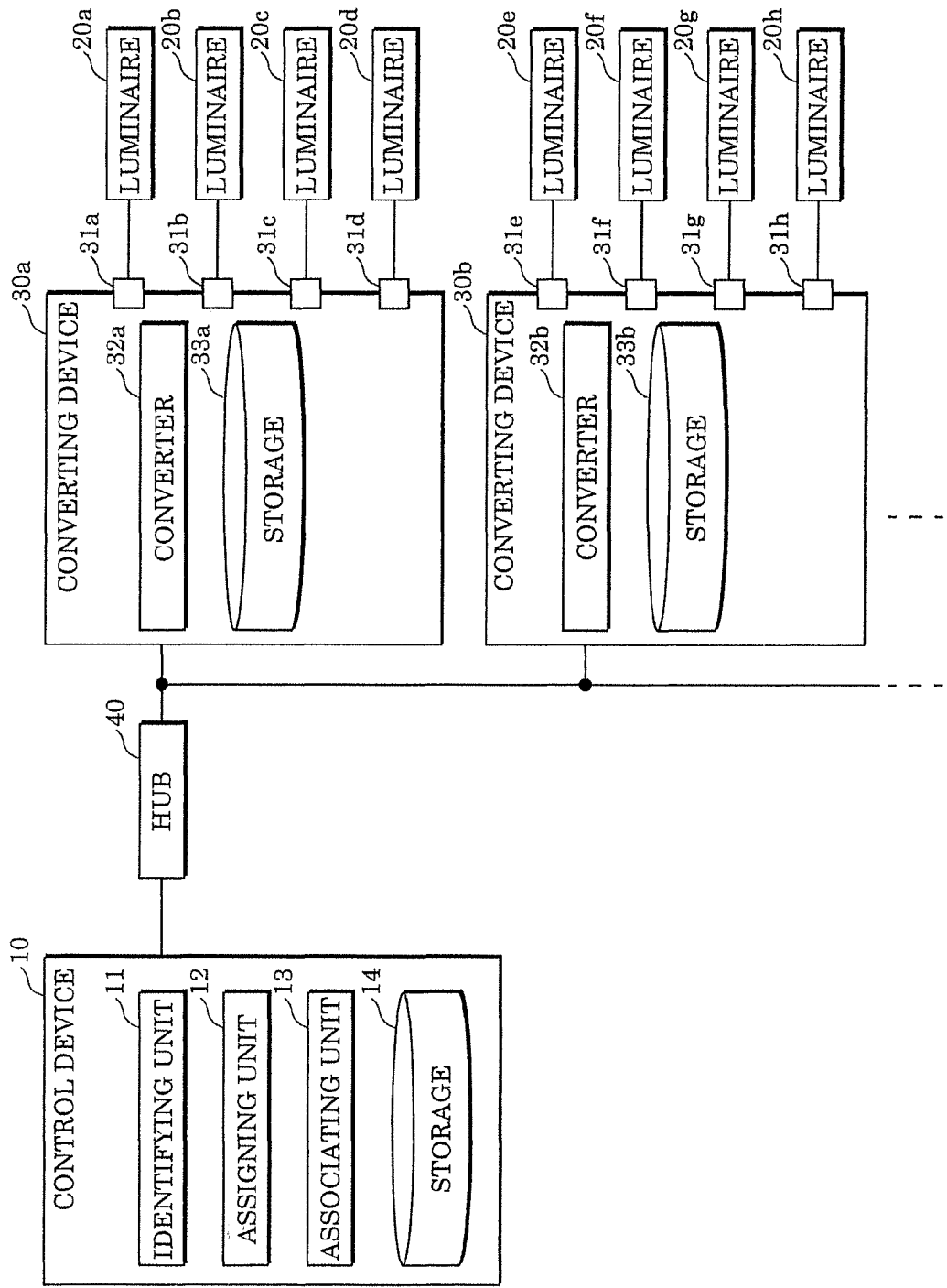
FIG. 1 is a block diagram illustrating an example of a lighting system according to Embodiment 1.

FIG. 1 is a block diagram illustrating an example of a lighting system according to Embodiment 1.

In the lighting system according to Embodiment 1, control device 10 is connected to luminaires 20a to 20h. Specifically, control device 10 is connected to converting devices 30a, 30b, . . . via hub 40, and converting devices 30a and 30b respectively have connectors 31a to 31d and connectors 31e to 31h to which luminaires 20a to 20h are connected. It is to be noted that hereinafter, converting devices 30a, 30b, . . . , connectors 31 to 31h, and luminaires 20a to 20h are also collectively referred to as converting devices 30, connectors 31, and luminaires 20, respectively. As stated above, in the lighting system according to Embodiment 1, control device 10 is connected to luminaires 20 via connectors 31 included in converting devices 30 connected to control device 10.

Control device 10 is a device which assigns luminaires 20 ID numbers using, for example, the RDM (Remote Device Management) protocol. Control device 10 is, for example, a lighting control console, a PC (Personal Computer), or a device such as a tablet terminal. The Ethernet (registered trademark) protocol is used for communication between control device 10 and converting devices 30, and the RDM protocol is used for communication between converting devices 30 and luminaires 20. The RDM protocol is a protocol allowing two-way communication using DMX512-A. Control device 10 respectively assigns luminaires 20 all 512 channels (512 ID numbers (DMX numbers)) compliant with DMX512-A. Each of the ID numbers is associated with control data including 8 bits. For example, a lighting control rate or a color of light outputted by each of the luminaires is controlled based on the control data. Moreover, control device 10 may assign one luminaire 20 ID numbers. For example, when one luminaire 20 includes a light source for outputting red light, a light source for outputting green light, and a light source for outputting blue light, three ID numbers may be assigned to one luminaire 20 to control each of the light sources, and the colors of light outputted by one luminaire 20 may be carefully controlled.

It is to be noted that assigning an ID number to luminaire 20 by control device 10 (assigning unit 12 to be described later) means storing the ID number into a storage (not shown) included in luminaire 20 by control device 10. For example, when control device 10 assigns luminaire 20a ID number 1, control device 10 stores ID number 1 into a storage included in luminaire 20a. This allows luminaire 20a to recognize that luminaire 20a is assigned ID number 1. For example, when luminaire 20a receives a signal (hereinafter also referred to as a DMX512 signal) including 512 ID numbers compliant with DMX512-A and control data corresponding to each of the 512 ID numbers, luminaire 20a makes it possible to perform an operation based on the control data associated with ID number 1 among the 512 ID numbers, by executing the control data. Specifically, the DMX512 signal is a signal including 512 data slots which store the control data and with which ID numbers 1 to 512 are associated respectively. After ID numbers are assigned to luminaires 20, a user generates a DMX512 signal by associating control data for causing luminaires 20 which the user causes to perform a desired operation to perform the desired operation with the ID numbers assigned to luminaires 20, and stores the generated DMX512 signal into control device 10. Control device 10 controls luminaires 20 by transmitting the DMX512 signal for which the association has been completed to luminaires 20 via converting devices 30. In other words, control device 10 is a device which is not only capable of assigning luminaires 20 the ID numbers but also is capable of controlling luminaires 20 to which the ID numbers are assigned. It is to be noted that the assigning of the ID numbers to luminaires 20 by control device 10 will be described in detail later with reference to FIG. 2 to FIG. 5B.

Each of luminaires 20 is a luminaire corresponding to the RDM protocol. Specifically, when luminaire 20 receives the DMX512 signal, luminaire 20 executes the control data associated with, among the 512 ID numbers included in the DMX512 signal, the ID number assigned to luminaire 20. Luminaire 20 is a luminaire including, for example, an LED (light-emitting diode) as a light source. It is to be noted that luminaire 20 may be a luminaire including another light source. In addition, the storage included in luminaire 20 stores in advance information indicating a type of luminaire 20. Information indicating a type is information indicating, for example, a product number, a model name or a model number assigned to a luminaire of the same kind. Luminaires 20 of the same type each store in advance information indicating the same type.

Each of converting devices 30 transmits a signal received from control device 10 to luminaire 20. Converting device 30a includes converter 32a and storage 33a, and converting device 30b includes converter 32b and storage 33b. Moreover, in Embodiment 1, one luminaire 20 is connected to each of connectors 31. For example, only luminaire 20a is connected to connector 31a. Connector 31 is, for example, a connector for connecting luminaire 20 to converting device 30. It is to be noted that hereinafter, converters 32a and 32b are also collectively referred to as converters 32, and storages 33a and 33b are also collectively referred to as storages 33.

Converter 32 performs conversion between the Ethernet (registered trademark) protocol and the RDM protocol. For example, when converter 32 receives from control device 10 a signal compliant with the Ethernet (registered trademark) protocol, converter 32 converts the signal into a signal compliant with the RDM protocol and transmits the converted signal to luminaire 20. Moreover, for example, when converter 32 receives from luminaire 20 a signal compliant with the RDM protocol, converter 32 converts the signal into a signal compliant with the Ethernet (registered trademark) protocol and transmits the converted signal to control device 10.

Storage 33 stores associations between connectors 31 and groups respectively assigned to connectors 31. The groups and the associations stored in storage 33 will be described below.

[Configuration of Control Device]

Next, a configuration of control device 10 will be described in detail.

Control device 10 includes identifying unit 11, assigning unit 12, associating unit 13, and storage 14.

Storage 14 stores associations between types of luminaires 20 and ID number ranges for each of the types. Specifically, storage 14 stores associations among types of luminaires 20, ID number ranges, and one of at least two groups (DMX groups) for each of the types. It is to be noted that associations stored in storage 14 means the associations among the types of luminaires 20, the ID number ranges, and one of the at least two groups (DMX groups) for each of the types. The following describes groups.

Because luminaires 20 installed in a theater, a stage, or a studio, etc. often total more than several hundred, and ID numbers are assigned to one luminaire 20, all luminaires 20 cannot be sometimes controlled with only the 512 ID numbers compliant with DMX512-A. In view of this, a DMX512 signal is given, for example, a label called a group. For example, control device 10 makes it possible to control luminaires 20 using 1024 ID numbers included in a DMX512 signal of a first group and a DMX512 signal of a second group. In other words, for example, different control data can be associated with each of ID number 1 included in the DMX512 signal of the first group and ID number 1 included in the DMX512 signal of the second group. In such a way, the groups allow control device 10 to control more luminaires 20.

Next, the associations stored in storage 14 will be described with reference to FIG. 2.

Figures 2, 3:
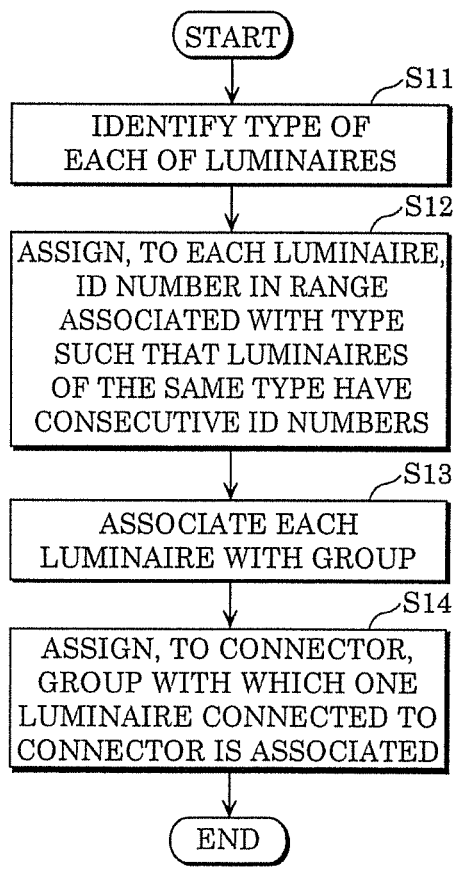
FIG. 2 is a table illustrating an example of associations stored in a storage according to Embodiment 1.
FIG. 3 is a flow chart illustrating an example of an operation performed by a control device according to Embodiment 1.

FIG. 2 is a table illustrating an example of the associations stored in storage 14 according to Embodiment 1.

As illustrated in FIG. 2, storage 14 stores, for example, a table in which a group and an ID number range are associated with one another for each type. It is to be noted that the number of luminaires 20 controlled by control device 10 is known in advance, and it is assumed, for example, that the number of luminaires 20 of type "a" is less than or equal to 10, the number of luminaires 20 of type "b" is less than or equal to 20, the number of luminaires 20 of type "c" is less than or equal to 20, the number of luminaires 20 of type "d" is less than or equal to 10, and the number of luminaires 20 of type "e" is less than or equal to 10. It is also to be noted that since there is a case where the number of luminaires 20 controlled by control device 10 is unknown, an ID number range associated with each type may be broader. FIG. 2 indicates that, for example, one of ID numbers 1 to 10 is assigned to luminaire 20 of type "a." FIG. 2 also indicates that, for example, luminaire 20 of type "a" and a first group are associated with one another. Association between luminaire 20 and a group will be described later with reference to FIG. 5A. The ID number ranges do not overlap one another for each type associated with the same group in the associations. Specifically, the ID number ranges associated with types "a," "c," and "d" associated with the first group are respectively ranges of 1 to 10, 11 to 30, and 31 to 40 which do not overlap one another. Likewise, the ID number ranges associated with types "b" and "e" associated with a second group are respectively ranges of 1 to 10, 11 to 30, and 31 to 40 which do not overlap one another. More specifically, ID numbers in respective ID number ranges that do not overlap one another are respectively assigned to luminaires 20 of different types associated with the same group. In other words, ID numbers in respective ID number ranges that overlap one another can be respectively assigned to luminaires 20 of types each associated with a different group. For example, ID number 1 can be assigned to each of luminaire 20 of type "a" and luminaire 20 of type "b."

The associations are, for example, stored in storage 14 in advance before identifying unit 11 to be described later identifies a type of luminaire 20. In other words, the user stores into storage 14 the types of luminaires 20 and the ID number ranges in association with one another before identifying unit 11 identifies a type of luminaire 20.

It is to be noted that each of storage 14, storage 33, and a storage included in luminaire 20 is a semiconductor memory such as a read-only memory (ROM) in which a program and data are stored, and is, for example, a non-volatile memory such as an electrically erasable programmable read-only memory (EEPROM).

Identifying unit 11 will be described in detail later with reference to FIG. 3 and FIG. 4A.

Assigning unit 12 will be described in detail later with reference to FIG. 3, FIG. 4B, and FIG. 5B.

Associating unit 13 will be described in detail later with reference to FIG. 3, FIG. 5A, and FIG. 5B.

Identifying unit 11, assigning unit 12, and associating unit 13 are implemented by a processor etc. executing a control program stored in storage 14, but may be implemented by a microcomputer or a dedicated communication circuit etc.

[Operation by Control Device]

Next, an operation performed by control device 10 will be described in detail with reference to FIG. 3.

FIG. 3 is a flow chart illustrating an example of an operation performed by control device 10 according to Embodiment 1.

First, identifying unit 11 identifies a type of each of luminaires 20 (step S11). For example, when obtaining a global ID from luminaire 20 connected to connector 31, identifying unit 11 obtains information indicating a type. The global ID is identification information which is unique to luminaire 20 and includes, for example, 48 bits, and is stored in advance in the storage included in luminaire 20. Identifying unit 11 selects one of connectors 31 by a search algorithm (algorithm using binary search) for luminaire 20 using the RDM protocol, and obtains the global ID from luminaire 20 connected to selected connector 31. It is to be noted that control device 10 is assumed to recognize an ID, an address, or the like of each of connectors 31. By performing this process for all connectors 31, identifying unit 11 obtains the global ID from each of luminaires 20 respectively connected to connectors 31. Moreover, as stated above, identifying unit 11 obtains the information indicating the type when obtaining the global ID. For example, when obtaining the global ID and the information indicating the type from luminaire 20 connected to selected connector 31, identifying unit 11 stores into storage 14 connector 31 and the global ID and type of luminaire 20 connected to connector 31 in association with one another. As a result, control device 10 is capable of determining what global ID and type luminaire 20 connected to each of connectors 31 has. In this way, identifying unit 11 is capable of identifying the type of each of luminaires 20. It is assumed that identifying unit 11 has identified the type of each of luminaires 20 as illustrated in, for example, FIG. 4A.

FIG. 4A is a diagram illustrating examples of respective types of luminaires 20 identified by identifying unit 11 according to Embodiment 1.

As illustrated in FIG. 4A, it is assumed that identifying unit 11 has identified luminaires 20a to 20d and 20g as type "a" and luminaires 20e, 20f, and 20h as type "b."

Next, by reference to the associations stored in storage 14, assigning unit 12 respectively assigns luminaires 20 ID numbers in an ID number range associated with the type of each luminaire 20 identified by identifying unit 11 such that luminaires 20 of the same type have consecutive ID numbers in the ID number range (step S12). For example, assigning unit 12 respectively assigns luminaires 20 of type "a" ID numbers 1 to 10 in the ID number range associated with type "a" in the associations illustrated in FIG. 2 such that luminaires 20 of type "a" have consecutive ID numbers in the ID number range. Moreover, for example, assigning unit 12 respectively assigns luminaires 20 of type "b" ID numbers 1 to 20 in the ID number range associated with type "b" in the associations illustrated in FIG. 2 such that luminaires 20 of type "b" have consecutive ID numbers in the ID number range. Specifically, assigning unit 12 respectively assigns luminaires 20 ID numbers as illustrated in FIG. 4B.

FIG. 4B is a diagram illustrating examples of ID numbers respectively assigned to luminaires 20 by assigning unit 12 according to Embodiment 1.

Because identifying unit 11 has identified luminaires 20a to 20d and 20g as type "a" as illustrated in FIG. 4A, assigning unit 12 respectively assigns luminaires 20a to 20d and 20g ID numbers 1, 2, 3, 4, and 5 as illustrated in FIG. 4B. Accordingly, the respectively assigned ID numbers become consecutive in order of luminaires 20a, 20b, 20c, 20d, and 20g. Likewise, because identifying unit 11 has identified luminaires 20e, 20f, and 20h as type "b" as illustrated in FIG. 4A, assigning unit 12 respectively assigns luminaires 20e, 20f, and 20h ID numbers 1, 2, and 3 as illustrated in FIG. 4B. Accordingly, the respectively assigned ID numbers become consecutive in order of luminaires 20e, 20f, and 20h.

Assigning unit 12 respectively assigns luminaires 20 ID numbers, for example, in order of types identified by identifying unit 11 such that luminaires 20 of the same type have consecutive ID numbers. For example, it is assumed that identifying unit 11 has identified the type of each of luminaires 20 respectively connected to connectors 31a, 31b, 31c, . . . , 31h in listed order. In this case, because type "a" is identified in order of luminaires 20a, 20b, 20c, 20d, and 20g, ID numbers 1, 2, 3, 4, and 5 are respectively assigned to luminaires 20a, 20b, 20c, 20d, and 20g in listed order. Likewise, because type "b" is identified in order of luminaires 20e, 20f, and 20h, ID numbers 1, 2, and 3 are respectively assigned to luminaires 20e, 20f, and 20h in listed order.

Next, by reference to the associations stored in storage 14, associating unit 13 associates each of luminaires 20 with a group associated with the type of each luminaire 20 identified by identifying unit 11 (step S13). Specifically, associating unit 13 associates each luminaire 20 with a group as illustrated in FIG. 5A.

FIG. 5A is a diagram illustrating an example of associations between luminaires 20 and groups made by associating unit 13 according to Embodiment 1.

Because identifying unit 11 has identified luminaires 20a to 20d and 20g as type "a" as illustrated in FIG. 4A, associating unit 13 associates luminaires 20a to 20d and 20g with a first group associated with type "a" in the associations illustrated in FIG. 2. Likewise, because identifying unit 11 has identified luminaires 20e, 20f, and 20h as type "b" as illustrated in FIG. 4A, associating unit 13 associates luminaires 20e, 20f, and 20h with a second group associated with type "b" in the associations illustrated in FIG. 2.

It is to be noted that associating luminaire 20 with a group by associating unit 13 means, for example, storing an association between luminaire 20 and the groups into storage 14 by associating unit 13. For example, when associating luminaire 20a with the first group, associating unit 13 stores the association between luminaire 20a and the first group into storage 14. In this way, control device 10 is capable of recognizing the associations between luminaires 20 and the groups. The step of associating luminaire 20 with a group by associating unit 13 may be performed before assigning the ID numbers.

Next, when one luminaire 20 is connected to connector 31, assigning unit 12 assigns connector 31 connected to one luminaire 20 a group associated with one luminaire 20 by associating unit 13 (step S14). Specifically, assigning unit 12 respectively assigns connectors 31 groups as illustrated in FIG. 5B.

FIG. 5B is a diagram illustrating examples of groups respectively assigned to connectors 31 by assigning unit 12 according to Embodiment 1.

Because associating unit 13 has associated luminaires 20a to 20d and 20g with the first group as illustrated in FIG. 5A, assigning unit 12 assigns the first group to connectors 31a to 31d and 31g respectively connected to luminaires 20a to 20d and 20g. Likewise, because associating unit 13 has associated luminaires 20e, 20f, and 20h with the second group as illustrated in FIG. 5A, assigning unit 12 assigns the second group to connectors 31e, 31f, and 31h to which luminaires 20e, 20f, and 20h are respectively connected. As stated above, because storage 14 stores the information indicating which luminaire 20 (global ID) is connected to each of connectors 31, assigning unit 12 is capable of recognizing connectors 31 to which luminaires 20 are connected and of assigning a group to each of connectors 31.

It is to be noted that assigning connector 31 a group by assigning unit 12 means storing connector 31 and the group in association with one another into storage 33 included in converting device 30 by assigning unit 12. Specifically, each of connectors 31 is assigned, for example, a connector number in advance, and assigning unit 12 stores into storage 33 the connector numbers and groups in association with one another. For example, when assigning connector 31a the first group, assigning unit 12 stores into storage 33 the connector number of connector 31a and the first group in association with one another. In this way, converting device 30 is capable of recognizing a group assigned to connector 31 included therein.

It is to be noted that because luminaire 20 does not determine which group a received DMX512 signal belongs to, luminaire 20 executes control data associated with, among the 512 ID numbers included in the received DMX512 signal, the ID number of luminaire 20 regardless of the group of the received DMX512 signal. Accordingly, even when converting device 30 transmits to luminaire 20 a DMX512 signal of a group different from the group associated with luminaire 20, luminaire 20 occasionally executes the control data associated with, among the 512 ID numbers included in the DMX512 signal of the different group, the ID number of luminaire 20. In other words, when different control data is associated with each of the same ID numbers (e.g., ID number 1 of the first group and ID number 1 of the second group) included in respective DMX512 signals of different groups, luminaire 20 occasionally performs an operation different from a desired one. However, because converting device 30 recognizes which group is assigned to each of connectors 31 included in converting device 30, luminaire 20 can be caused to perform the desired operation by transmitting to luminaire 20 a DMX512 signal of the group associated with luminaire 20.

For example, when control device 10 transmits to converting device 30a the DMX512 signal of the first group and the DMX512 signal of the second group, converting device 30a transmits the DMX512 signal of the first group to luminaires 20a to 20d connected to connectors 31a to 31d to which the first group is assigned. Likewise, for example, when control device 10 transmits to converting device 30b the DMX512 signal of the first group and the DMX512 signal of the second group, converting device 30b transmits the DMX512 signal of the first group to luminaire 20g connected to connector 31g to which the first group is assigned, and the DMX512 signal of the second group to luminaires 20e, 20f, and 20h connected to connectors 31e, 31f, and 31h to which the second group is assigned. For example, luminaires 20a and 20e are assigned ID number 1 as illustrated in FIG. 4B. However, because luminaire 20a executes control data associated with ID number 1 included in the DMX512 signal of the first group, and luminaire 20e executes control data associated with ID number 1 included in the DMX512 signal of the second group, luminaires 20a and 20e each perform a desired operation.

It is to be noted that assigning connector 31 a group by assigning unit 12 means storing connector 31 and the group in association with one another into storage 14 included in control device 10 by assigning unit 12. In this case, control device 10 may transmit the DMX512 signal of the first group to converting device 30a, and cause converting device 30a to transmit the DMX512 signal of the first group to luminaires 20a to 20d connected to connectors 31a to 31d to which the first group is assigned. Moreover, control device 10 may transmit to converting device 30b the DMX512 signal of the first group and the DMX512 signal of the second group, and cause converting device 30b to transmit the DMX512 signal of the first group to luminaire 20g connected to connector 31g to which the first group is assigned, and the DMX512 signal of the second group to luminaires 20e, 20f, and 20h connected to connectors 31e, 31f, and 31h to which the second group is assigned.

As just described, when one luminaire 20 is connected to connector 31, one luminaire 20 can be caused to perform the desired operation based on the DMX512 signal of the group associated with one luminaire 20, by assigning unit 12 assigning the group associated with one luminaire 20 to connector 31 to which one luminaire 20 is connected.

Advantageous Effects Etc.

Conventionally, luminaires installed in a theater, a stage, or a studio, etc. have often totaled more than several hundred, and it takes some time and is burdensome to manually assign ID numbers to the luminaires.

In view of this, control device 10 according to Embodiment 1 is a control device to which luminaires 20 are connected. Control device 10 includes: storage 14 which stores associations between types of luminaires 20 and identification (ID) number ranges for each of the types; identifying unit 11 which identifies a type of each of luminaires 20. In addition, control device 10 includes assigning unit 12 which, by reference to the associations stored in storage 14, assigns, to each of luminaires 20, an ID number in an ID number range for the type identified by the identifying unit such that, among luminaires 20, luminaires 20 of a same type have consecutive ID numbers in the ID number range.

Moreover, a method for assigning an ID number according to Embodiment 1 is a method for assigning an ID (identification) number to each of luminaires 20 connected to control device 10. The method includes identifying a type of each of luminaires 20. In addition, the method includes assigning, by reference to associations, to each of luminaires 20, an ID number in an ID number range for the type identified in the identifying such that, among luminaires 20, luminaires 20 of a same type have consecutive ID numbers in the ID number range, the associations being stored in storage 14 included in control device 10 and being associations between types of luminaires and ID number ranges for each of the types.

With this, because control device 10 (assigning unit 12) automatically assigns each of luminaires 20 an ID number from an ID number range associated with the type of each luminaire 20, based on the associations stored in storage 14, control device 10 is capable of easily assigning luminaires 20 respective ID numbers for controlling luminaires 20. Moreover, for example, when control device 10 associates an ID number included in a signal (e.g., DMX512 signal) for controlling luminaires 20 with control data, the user often performs the association for each of the types. However, when ID numbers are randomly assigned to luminaires 20 of the same type, it takes time to perform the association. In contrast, because control device 10 according to Embodiment 1 assigns each of luminaires 20 an ID number such that luminaires 20 of the same type have consecutive ID numbers, the ID numbers of luminaires 20 of the same type become consecutive, which makes it easy to associate the ID number with the control data for each type.

Moreover, the associations are associations among the types of luminaires 20, the ID number ranges, and one of at least two groups for each of the types. In addition, the ID number ranges do not overlap one another for each type associated with the same group in the associations stored in storage 14. Control device 10 further includes associating unit 13 which, by reference to the associations stored in storage 14, associates each of luminaires 20 with the one of the at least two groups that is associated with the type of each of luminaires 20 identified by identifying unit 11.

For example, all of luminaires 20 cannot be sometimes controlled with only the 512 ID numbers compliant with DMX512-A. In view of this, a signal for controlling luminaires 20 (DMX512 signal) is given, for example, a label called a group. Moreover, because associating unit 13 associates luminaires 20 with groups, control device 10 is capable of determining which group of the DMX512 signal is transmitted to which luminaire 20. With this, the ID number can be associated with the control data for controlling luminaire 20 in the DMX512 signal of each group, and more luminaires 20 can be controlled. When, for example, a group is not assigned to the DMX512 signal, control device 10 is capable of controlling only up to 512 luminaires 20. In comparison, the number of controllable luminaires 20 can be increased by 512 for every DMX512 signal of a different group. Moreover, because ID numbers can be assigned from ID number ranges that do not overlap each other (e.g., ranges that do not overlap each other such as 1 to 10 and 11 to 30) for each type associated with the same group, the user is allowed to easily manage the ID numbers for each type.

Moreover, control device 10 is connected to luminaires 20 via connectors 31 included in converting device 30 connected to control device 10. When one of luminaires 20 is connected to one of connectors 31, assigning unit 13 assigns, to one connector 31 to which one luminaire 20 is connected, a group associated with one luminaire 20 by associating unit 13.

With this, because the group associated with one luminaire 20 is assigned to connector 31 to which one luminaire 20 is connected, one luminaire 20 does not need to manage the group associated with one luminaire 20, which makes it possible to reduce data processing in one luminaire 20. In other words, because luminaire 20 receives, among signals of different groups, only the signal of the group assigned to connector 31 (i.e., the group associated with luminaire 20), luminaire 20 does not need to determine whether the received signal is the signal of the group associated with luminaire 20, which makes it possible to reduce data processing.

Moreover, control device 10 assigns the ID number to each of luminaires 20 using the Remote Device Management (RDM) protocol compliant with DMX512-A (Digital Multiplex), and the ID number range is a predetermined range between 1 and 512 channels compliant with DMX512-A.

With this, it is possible to easily control luminaires 20 installed in, for example, a theater, a stage, or a studio, using the RDM protocol compliant with DMX512-A.

Embodiment 2

Hereinafter, Embodiment 2 will be described with reference to FIG. 6 to FIG. 11.

Figure 6:
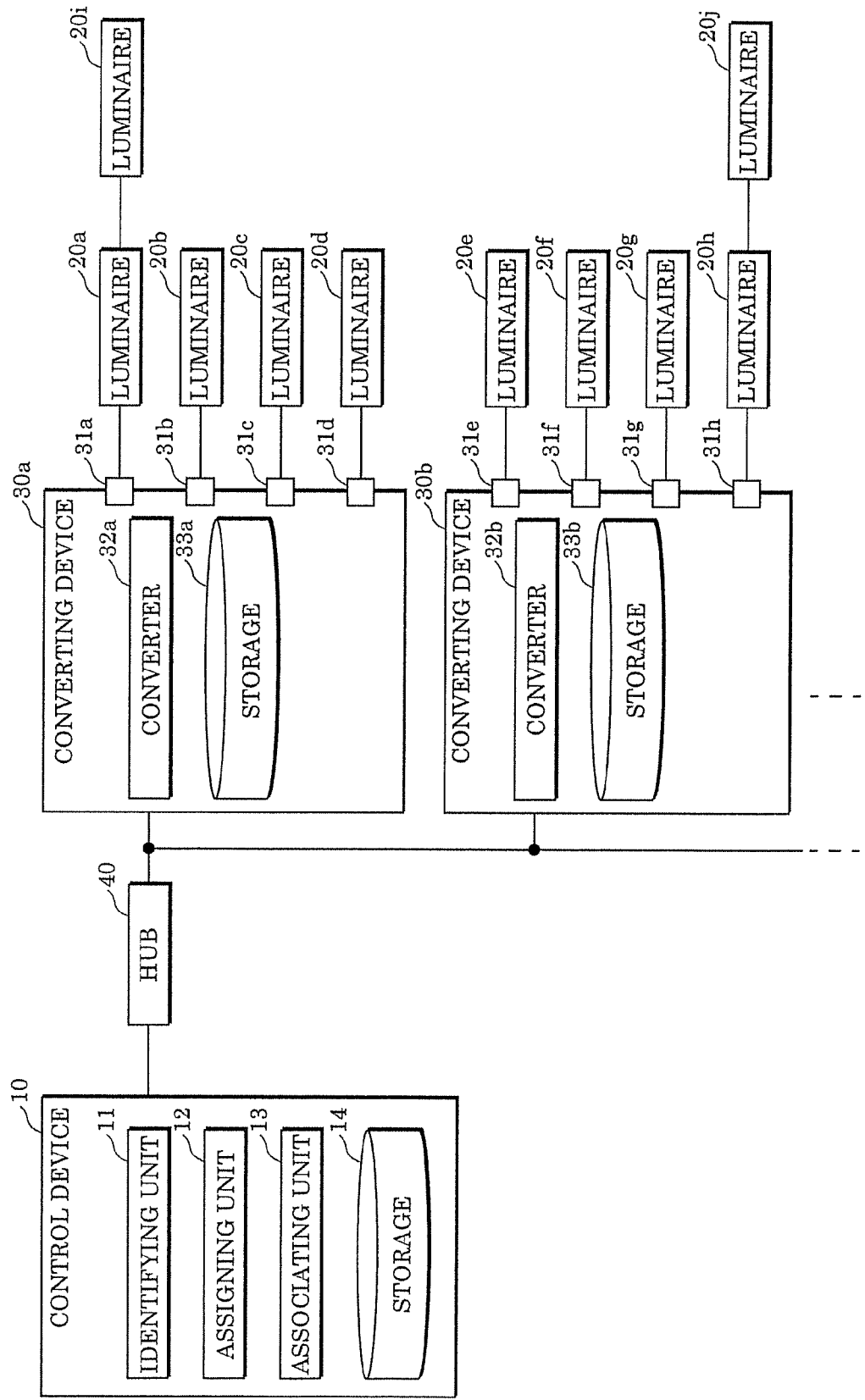
FIG. 6 is a block diagram illustrating an example of a lighting system according to Embodiment 2.

FIG. 6 is a block diagram illustrating an example of a lighting system according to Embodiment 2.

The lighting system according to Embodiment 2 differs from the lighting system according to Embodiment 1 in that at least two luminaires 20 are connected to connector 31 by what is called a daisy chain. Moreover, when at least two luminaires 20 are connected to one connector 31, assigning unit 12 and associating unit 13 perform different operations for one connector 31 and at least two luminaires 20 than in Embodiment 1. It is to be noted that when one luminaire 20 is connected to one connector 31, assigning unit 12 and associating unit 13 perform the same operations for one connector 31 and one luminaire 20 as in Embodiment 1. The other structural elements are the same as in the lighting system according to Embodiment 1, and thus description thereof is omitted.

As illustrated in FIG. 6, luminaires 20a and 20i are connected to connector 31a, and luminaires 20h and 20j are connected to connector 31h. It is to be noted that 32 luminaires 20, for example, can be connected to one connector 31, but the following describes an example in which two luminaires 20 are connected to one connector 31, for the sake of simplicity. An operation performed in this case by control device 10 according to Embodiment 2 will be described with reference to FIG. 7.

FIG. 7 is a flow chart illustrating an example of the operation performed by control device 10 according to Embodiment 2.

Steps S11 to S13 are the same as in Embodiment 1, and thus description thereof is omitted. It is to be noted that associations stored in storage 14 are the same as the ones illustrated in FIG. 2. In addition, it is assumed in Embodiment 2 that identifying unit 11 has identified the type of each of luminaires 20 as illustrated in, for example, FIG. 8A.

FIG. 8A is a diagram illustrating examples of respective types of luminaires 20 identified by identifying unit 11 according to Embodiment 2.

As illustrated in FIG. 8A, it is assumed that identifying unit 11 has identified luminaires 20a to 20d, 20g, 20i, and 20j as type "a," and luminaires 20e, 20f, and 20h as type "b."

Moreover, in Embodiment 2, assigning unit 12 respectively assigns luminaires 20 ID numbers as illustrated in FIG. 8B.

FIG. 8B is a diagram illustrating examples of the ID numbers respectively assigned to luminaires 20 by assigning unit 12 according to Embodiment 2.

Because identifying unit 11 has identified luminaires 20a to 20d, 20g, 20i, and 20j as type "a" as illustrated in FIG. 8A, assigning unit 12 respectively assigns luminaires 20a to 20d, 20g, 20i, and 20j ID numbers 1, 2, 3, 4, 5, 6, and 7 as illustrated in FIG. 8B. Likewise, because identifying unit 11 has identified luminaires 20e, 20f, and 20h as type "b" as illustrated in FIG. 8A, assigning unit 12 respectively assigns luminaires 20e, 20f, and 20h ID numbers 1, 2, and 3 as illustrated in FIG. 8B.

As stated above, assigning unit 12 respectively assigns luminaires 20 ID numbers, for example, in order of types identified by identifying unit 11 such that luminaires 20 of the same type have consecutive ID numbers. For example, it is assumed that identifying unit 11 has identified the type of each of luminaires 20 respectively connected to connectors 31a, 31b, 31c, . . . , 31h in listed order. In this case, because type "a" is identified in order of luminaires 20a, 20i, 20b, 20c, 20d, 20g, and 20j, ID numbers 1, 2, 3, 4, 5, 6, and 7 are respectively assigned to luminaires 20a, 20i, 20b, 20c, 20d, 20g, and 20j in listed order. Likewise, because type "b" is identified in order of luminaires 20e, 20f, and 20h, ID numbers 1, 2, and 3 are respectively assigned to luminaires 20e, 20f, and 20h in listed order.

Moreover, in Embodiment 2, associating unit 13 associates each luminaire 20 with a group as illustrated in FIG. 9A.

FIG. 9A is a diagram illustrating an example of associations between luminaires 20 and groups made by associating unit 13 according to Embodiment 2.

Because identifying unit 11 has identified luminaires 20a to 20d, 20g, 20i, and 20j as type "a" as illustrated in FIG. 8A, associating unit 13 associates luminaires 20a to 20d, 20g, 20i, and 20j with the first group associated with type "a" in the associations illustrated in FIG. 2. Likewise, because identifying unit 11 has identified luminaires 20e, 20f, and 20h as type "b" as illustrated in FIG. 8A, associating unit 13 associates luminaires 20e, 20f, and 20h with the second group associated with type "b" in the associations illustrated in FIG. 2.

When one luminaire 20 is connected to connector 31, step S14 is performed. In the lighting system according to Embodiment 2, because one luminaire 20 is connected to each of connectors 31b to 31g, step S14 is performed for connectors 31b to 31g.

On the other hand, when at least two luminaires 20 are connected to connector 31, steps S21 to S25 are performed. In the lighting system according to Embodiment 2, because two luminaires 20 are connected to each of connectors 31a and 31h, processing subsequent to step S21 is performed for connectors 31a and 31h.

Associating unit 13 determines whether at least two (two in Embodiment 2) luminaires 20 connected to connector 31 are each associated with a different group (step S21). As illustrated in FIG. 9A, associating unit 13 has associated luminaires 20a and 20i connected to connector 31a with the first group, and luminaires 20h and 20j connected to connector 31h with the second group and the first group, respectively.

When associating unit 13 has associated at least two luminaires 20 connected to connector 31 with the same group (No in step S21), assigning unit 12 assigns the same group to connector 31 to which at least two luminaires 20 are connected (step S22). Specifically, because luminaires 20a and 20i connected to connector 31a are associated with the first group as the same group, assigning unit 12 assigns connector 31a the first group.

In contrast, when having associated each of at least two luminaires 20 connected to connector 31 with a different group (Yes in step S21), associating unit 13 re-associates at least two luminaires 20 with the same predetermined group (step S23). Here, a predetermined group may be, for example, a group determined in advance. The group determined in advance may be, for example, a fixed group such as the first group, or a group based on a predetermined rule such as selecting, among the different groups, a group having the smallest or largest value. Moreover, the predetermined group may be, for example, a group selected by the user based on a content displayed on a screen by a display (not shown) included in control device 10 when associating unit 13 associates each of at least two luminaires 20 with the different group, the content being for prompting the user to select a group. The display is, for example, a touch panel display etc. As described above, the predetermined group may be the group the user selects via the display. In Embodiment 2, associating unit 13 re-associates two luminaires 20 with the same predetermined group as illustrated in FIG. 9B.

FIG. 9B is a diagram illustrating an example of associations between luminaires 20 and groups remade by assigning unit 13 according to Embodiment 2.

In Embodiment 2, the predetermined group is the first group, and as illustrated in FIG. 9B, associating unit 13 re-associates luminaire 20h associated with the second group with the first group. Consequently, the groups associated with luminaires 20h and 20j connected to connector 31h become the same group.

Next, by reference to the associations stored in storage 14, assigning unit 12 re-assigns, to luminaires 20 which associating unit 13 has re-associated with the groups, ID numbers in an ID number range associated with, among types associated with the predetermined group, a predetermined type such that luminaires 20 of the predetermined group have consecutive ID numbers in the ID number range (step S24). The predetermined type among the types associated with the predetermined group is not particularly limited, but is, for example, a type associated with a range having the smallest value among ID number ranges associated with the predetermined group in the associations. When the predetermined group is the first group, value ranges corresponding to the first group are 1 to 10, 11 to 30, 31 to 40, . . . , and the value range having the smallest value is 1 to 10 among these value ranges. Accordingly, the predetermined type is "a" associated with ID number range 1 to 10. With this, as illustrated in FIG. 10, assigning unit 12 re-assigns an ID number to luminaire 20h as luminaire 20 which associating unit 13 has re-associated with the group.

FIG. 10 is a diagram illustrating examples of ID numbers respectively re-assigned to luminaires 20 by assigning unit 12 according to Embodiment 2.

Assigning unit 12 has already respectively assigned luminaires 20a to 20d, 20g, 20i, and 20j of type "a" ID numbers 1 to 7. As a result, as illustrated in FIG. 10, assigning unit 12 re-assigns luminaire 20h ID number 8 which is next to ID number 7.

Subsequently, assigning unit 12 assigns the predetermined group to connector 31 to which at least two luminaires 20 are connected (step S25). Specifically, assigning unit 12 respectively assigns connectors 31 groups as illustrated in FIG. 11.

FIG. 11 is a diagram illustrating examples of groups respectively assigned to connectors 31 by assigning unit 12 according to Embodiment 2.

Because associating unit 13 has associated luminaires 20a to 20d and 20g to 20j with the first group as illustrated in FIG. 9B, assigning unit 12 assigns the first group to connectors 31a to 31d, 31g, and 31h to which luminaires 20a to 20d and 20g to 20j are respectively connected. Likewise, because associating unit 13 has associated luminaires 20e and 20f with the second group as illustrated in FIG. 9B, assigning unit 12 assigns the second group to connectors 31e and 31f to which luminaires 20e and 20f are respectively connected.

As stated above, because luminaire 20 does not determine which group a received DMX512 signal belongs to, luminaire 20 executes control data associated with, among the 512 ID numbers included in the received DMX512 signal, the ID number of luminaire 20 regardless of the group of the received DMX512 signal. Accordingly, in a case where at least two luminaires 20 each associated with a different group are connected to one connector 31, when one connector 31 transmits a DMX512 signal of a group to at least two luminaires 20, one or more of at least two luminaires 20 occasionally execute the control data included in the DMX512 signal of the group different from a desired group. In Embodiment 2, however, because at least two luminaires 20 connected to one connector 31 are associated with the same group, converting device 30 transmits the DMX512 signal of the same group to at least two luminaires 20 via one connector 31, and at least two luminaires 20 make it possible to perform a desired operation.

Advantageous Effects Etc.

In a case where at least two of luminaires 20 are connected to one connector 31, when associating unit 13 associates at least two luminaires 20 with a same group, assigning unit 12 assigns the same group to one connector 31 to which at least two luminaires 20 are connected. In addition, when associating unit 13 associates each of at least two luminaires 20 with a different group, associating unit 13 re-associates at least two luminaires 20 with a predetermined group. By reference to the associations, assigning unit 12 re-assigns, to each of at least two luminaires 20 re-associated with the predetermined group by associating unit 13, an ID number in an ID number range associated with, among types associated with the predetermined group, a predetermined type such that at least two luminaires 20 of the predetermined type have consecutive ID numbers in the ID number range. Assigning unit 12 assigns the predetermined group to one connector 31 to which at least two luminaires 20 are connected.

When associating unit 13 associates luminaires 20 with groups based on the associations stored in storage 14, at least two luminaires 20 connected to one connector 31 by a daisy chain etc. are each sometimes assigned a different group. Because at least two luminaires 20 connected to one connector 31 receive a signal (DMX512 signal) of the same group, in this case, one or more of at least two luminaires 20 occasionally execute the control data included in the DMX51 of the group different from a desired group. In Embodiment 2, however, when at least two luminaires 20 connected to one connector 31 are each associated with a different group, at least two luminaires 20 are re-associated with the same group, which allows each of at least two luminaires 20 to execute the control data included in the DMX512 signal of the desired group. Note, however, that luminaire 20 which is re-associated with a group is re-assigned an ID number in an ID number range different from the ID number range associated with the type of luminaire 20 in the associations stored in storage 14. For example, as illustrated in FIG. 2, FIG. 8A, and FIG. 10, luminaire 20h of type "b" is assigned ID number 8 from 1 to 10 associated with type "a." Accordingly, in this case, because even luminaires 20 of the same type do not have consecutive ID numbers, for example, it is desirable that the display unit etc. included in control device 10 allow the user to check which luminaire 20 is re-assigned an ID number.

Moreover, control device 10 further includes a display. When associating unit 13 associates each of at least two luminaires 20 with the different group, the predetermined group is selected by a user based on a content which is displayed on a screen by the display and is for prompting the user to select a group.

With this, when associating unit 13 associates each of at least two luminaires 20 connected to one connector 31 with a different group, the user can assign one connector 31 a desired group.

OTHER EMBODIMENTS

Although control device 10 and the method for assigning an ID number according to the aforementioned embodiments have been described above, the present disclosure is not limited to the embodiments.

For example, although luminaires 20 are controlled by the DMX512 signal of each group in the aforementioned embodiments, the present disclosure is not limited to this. For example, luminaires 20 connected to control device 10 can be controlled by only the 512 ID numbers compliant with DMX512-A, no group needs not be assigned to the DMX512 signal. In this case, no group needs not be included in the associations stored in storage 14. In other words, control device 10 need not include associating unit 13. Moreover, the ID number ranges need not overlap each other for each type associated with the same group in the associations, and may be ranges which do not overlap each other for each of types of luminaires 20.

Even in this case, because the ID numbers can be assigned from the ID number ranges that do not overlap each other (e.g., ranges that do not overlap each other such as 1 to 10 and 11 to 30) for each type, the user is allowed to easily manage the ID numbers for each type.

Moreover, although the associations are stored in storage 14 in advance before identifying unit 11 identifies the type of each luminaire 20 in the aforementioned embodiments, the present disclosure is not limited to this. For example, the associations may be stored in storage 14 after identifying unit 11 identifies the type of each luminaire 20. Specifically, after identifying unit 11 identifies the type of each luminaire 20, the user may store into storage 14 the types identified by identifying unit 11 and desired ID number ranges in association with one another.

Furthermore, although the ID number range associated with each type is as illustrated in FIG. 2 in the aforementioned embodiments, the present disclosure is not limited to this. The user can freely set the ID number range associated with each type. For example, an ID number range associated with a type is set to have the greater number of ID numbers than the number of luminaires 20 of the type connected in the lighting system. With this, in the future, even when luminaire 20 of the type is additionally installed, it is possible to assign additionally installed luminaire 20 an ID number from unassigned ID numbers in the ID number range.

Moreover, although when associating unit 13 associates each of at least two luminaires 20 connected to one connector 31 with a different group, one or more of at least two luminaires 20 are re-associated with a group and re-assigned an ID number in Embodiment 2, the present disclosure is not limited to this. For example, in this case, at least two luminaires 20 connected to one connector 31 may be re-installed such that each of at least two luminaires 20 is of the same type or of a type associated with the same group.

Furthermore, the present disclosure can be implemented not only as control device 10 but also as a method including steps (processes) performed by the respective structural elements included in control device 10.

For example, these steps may be executed by a computer (computer system). The present disclosure can be implemented as a program which causes the computer to execute the steps included in the method. In addition, the present disclosure can be implemented as a non-transitory computer-readable recording medium on which the program is recorded, such as a CD-ROM.

For example, when the present disclosure is implemented as a program (software), each step is performed by executing the program using hardware resources such as a CPU, a memory, and an input/output circuit of a computer. Specifically, each step is performed by the CPU obtaining data from the memory or the input/output circuit, etc. and calculating the data, and outputting the results of the calculation to the memory or the input/output circuit, etc.

Moreover, each structural element included in control device 10 according to the aforementioned embodiments may be implemented as a dedicated communication circuit or a general-purpose circuit.

Furthermore, each structural element included in control device 10 according to the aforementioned embodiments may be implemented as large-scale integration (LSI) which is an integrated circuit (IC).

Moreover, the integrated circuit is not limited to the LSI, and may be implemented as a dedicated communication circuit or a general-purpose processor. A Field Programmable Gate Array (FPGA) which is programmable or a reconfigurable processor which allows reconfiguration of the connections and settings of circuit cells inside the LSI may be used.

In addition, if circuit integration technology that replaces LSI appears through advancement of semiconductor technology or other derived technology, that technology can be naturally used to carry out circuit integration of each structural element included in control device 10.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A control device which is connected to luminaires, the control device comprising:
a storage which stores associations between types of luminaires and identification (ID) number ranges for each of the types;
an identifying unit which identifies a type of each of the luminaires; and
an assigning unit which, by reference to the associations, assigns, to each of the luminaires, an ID number in an ID number range for the type identified by the identifying unit such that, among the luminaires, luminaires of a same type have consecutive ID numbers in the ID number range.

2. The control device according to claim 1,
wherein the associations are associations among the types of the luminaires, the ID number ranges, and one of at least two groups for each of the types,
the ID number ranges do not overlap one another for each of, among the types, types associated with a same one of the at least two groups in the associations, and
the control device further comprises
an associating unit which, by reference to the associations, associates each of the luminaires with the one of the at least two groups that is associated with the type of each of the luminaires identified by the identifying unit.

3. The control device according to claim 2,
wherein the control device is connected to the luminaires via connectors included in a converting device connected to the control device, and
when one of the luminaires is connected to one of the connectors, the assigning unit assigns, to the one connector to which the one luminaire is connected, a group associated with the one luminaire by the associating unit.

4. The control device according to claim 3,
wherein in a case where at least two of the luminaires are connected to the one connector:
(i) when the associating unit associates the at least two luminaires with a same group, the assigning unit assigns the same group to the one connector to which the at least two luminaires are connected; and
(ii) when the associating unit associates each of the at least two luminaires with a different group, the associating unit re-associates the at least two luminaires with a predetermined group, and
the assigning unit:
by reference to the associations, re-assigns, to each of the at least two luminaires re-associated with the predetermined group by the associating unit, an ID number in an ID number range associated with, among types associated with the predetermined group, a predetermined type such that the at least two luminaires of the predetermined type have consecutive ID numbers in the ID number range; and
assigns the predetermined group to the one connector to which the at least two luminaires are connected.

5. The control device according to claim 4, further comprising
a display,
wherein the predetermined group is a group selected by a user based on a content displayed on a screen by the display when the associating unit associates each of the at least two luminaires with the different group, the content being for prompting the user to select a group.

6. The control device according to claim 1,
wherein the ID number ranges do not overlap one another for each of the types.

7. The control device according to claim 1,
wherein the control device assigns the ID number to each of the luminaires using Remote Device Management (RDM) protocol compliant with DMX512-A (Digital Multiplex), and
the ID number range is a predetermined range between 1 and 512 channels compliant with the DMX512-A.

8. A method for assigning an ID (identification) number to each of luminaires connected to a control device, the method comprising:
identifying a type of each of the luminaires; and
assigning, by reference to associations, to each of the luminaires, an ID number in an ID number range for the type identified in the identifying such that, among the luminaires, luminaires of a same type have consecutive ID numbers in the ID number range, the associations being stored in a storage included in the control device and being associations between types of luminaires and ID number ranges for each of the types.

9. The method according to claim 8, wherein:
the associations are associations among the types of the luminaires, the ID number ranges, and one of at least two groups for each of the types,
the ID number ranges do not overlap one another for each of, among the types, types associated with a same one of the at least two groups in the associations, and
the method further comprises
by reference to the associations, associating each of the luminaires with the one of the at least two groups that is associated with the type of each of the luminaires identified in the identifying.

10. The method according to claim 9,
wherein the control device is connected to the luminaires via connectors included in a converting device connected to the control device, and
when one of the luminaires is connected to one of the connectors, in the assigning, a group associated with the one luminaire in the associating is assigned to the one connector to which the one luminaire is connected.

11. The method according to claim 10,
wherein in a case where at least two of the luminaires are connected to the one connector:
(i) when the at least two luminaires are associated with a same group, in the assigning, the same group is assigned to the one connector to which the at least two luminaires are connected; and
(ii) when each of the at least two luminaires is associated with a different group, the at least two luminaires are re-associated with a predetermined group, and
in the assigning:
by reference to the associations, an ID number in an ID number range associated with, among types associated with the predetermined group, a predetermined type, is re-assigned to each of the at least two luminaires re-associated with the predetermined group in the associating, such that the at least two luminaires of the predetermined type have consecutive ID numbers in the ID number range; and
the predetermined group is assigned to the one connector to which the at least two luminaires are connected.

12. The method according to claim 11, further comprising when each of the at least two luminaires is associated with the different group, prompting the user to select a group on a screen of the display, and selecting, by a user, the predetermined group.

13. The method according to claim 8,
wherein the ID number ranges do not overlap one another for each of the types.

14. The method according to claim 8,
wherein the ID number is assigned to each of the luminaires using Remote Device Management (RDM) protocol compliant with DMX512-A (Digital Multiplex), and
the ID number range is a predetermined range between 1 and 512 channels compliant with the DMX512-A.

15. A control device for controlling luminaires including luminaires of a first type and luminaires of a second type, the control device comprising:
a processor; and
one or more non-transitory storage, wherein:
the storage stores a control program and a table indicating associations between the first type and a first identification (ID) number range and between the second type and a second ID number range, and
the control program, when executed by the processor, causes the processor to:
identify a type of each of the luminaires; and
by reference to the associations, assign one ID number in the first ID number range to each of the luminaires identified as the first type, such that the luminaires of the first type are assigned with consecutive ID numbers, and assign one ID number in the second ID number range to each of the luminaires identified as the second type, such that the luminaires of the second type are assigned with consecutive ID numbers.

16. The control device according to claim 15, wherein:
the table further indicates associations between the first type and a first group and between the second type and a second group, and
the control program, when executed by the processor, further causes the processor to assign each of the luminaires identified as the first type to the first group, and to assign to each of the luminaires identified as the second type to the second group.

17. The control device according to claim 16,
wherein the first ID number range at least partially overlaps the second ID number range.

18. The control device according to claim 16, wherein:
the luminaires further include luminaires of a third type,
the table further indicates associations between the third type and a third identification (ID) number range and between the third type and a third group, and
the first ID number range does not overlap the third ID number range.

19. The control device according to claim 16, wherein:
the luminaires are connected to connectors, and
the control program, when executed by the processor, further causes the processor to assign connectors to which at least one of the luminaires of the first type is connected to the first group, and to connectors to which at least one of the luminaires of the second type is connected to the second group.

20. The control device according to claim 19, wherein in a case where at least two of the luminaires are connected to one connector:
(i) when the at least two luminaires are associated with the first group,
the first group is assigned to the one connector to which the at least two luminaires are connected; and
(ii) when the at least two luminaires are associated with the first group and the second group, respectively,
the at least two luminaires are re-associated with the first group, and,
by reference to the associations, an ID number in the first ID number range is re-assigned to each of the at least two luminaires having been associated with the second group, such that the at least two luminaires have consecutive ID numbers in the first ID number range, and
the first group is assigned to the one connector to which the at least two luminaires are connected.

* * * * *